Aug. 13, 1968

R. E. WILKINSON 3,397,169

ABRASION-RESISTANT MINERAL-FILLED THERMOSETTING
MOLDING COMPOSITION

Filed April 15, 1964

INVENTOR.
Robert E. Wilkinson,
BY
Trash, Jenkins & Hanley
Attorneys.

United States Patent Office 3,397,169
Patented Aug. 13, 1968

3,397,169
ABRASION-RESISTANT MINERAL-FILLED THERMOSETTING MOLDING COMPOSITION
Robert E. Wilkinson, Lafayette, Ind., assignor to Rostone Corporation, Lafayette, Ind., a corporation of Indiana
Filed Apr. 15, 1964, Ser. No. 360,038
12 Claims. (Cl. 260—37)

ABSTRACT OF THE DISCLOSURE

Mineral-filled thermosetting molding compositions having improved abrasion resistance. The addition of up to 10% polyethylene or other polyolefin greatly improves the abrasion resistance of conventional molding compositions containing 15% to 60% thermosetting resin, 40% to 85% mineral filler of which 50% may be fiberglass or other fibrous reinforcement. The addition is especially applicable with free radical initiated polymers, particularly polyester resins and epoxy-polybutadiene resins, with which it cross links. In some cases flexure strength is also slightly improved.

---

Figure 1:
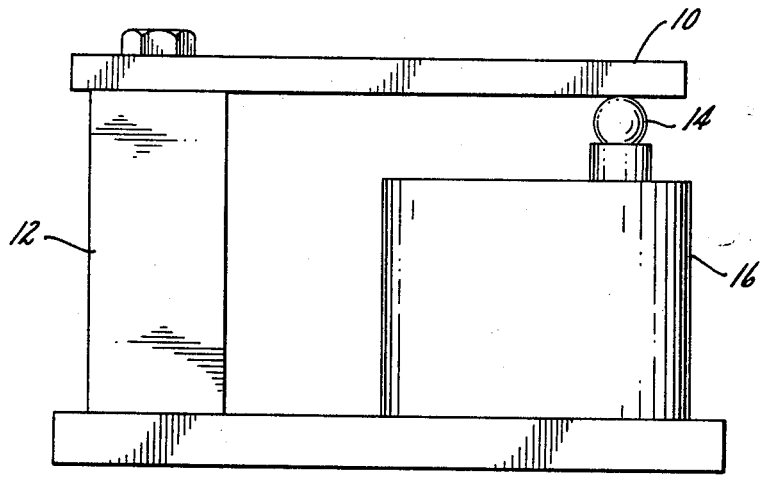

This invention relates to plastic moldings and particularly to moldings and molding compositions which possess a high degree of abrasion resistance.

Thermosetting molding compositions containing mineral fillers and reinforced with mineral fibers are widely used to provide electrical and mechanical components having advantageous physical, chemical and electrical characteristics. For example, moldings made with mineral fillers, such as aluminum hydrate, glass fibers, and polyester or epoxy resins have good dimensional stability, high mechanical strength, good corrosion resistance, and high arc-resistance, arc quenching and non-tracking properties. However, these otherwise advantageous moldings have low abrasion resistance, due both to the abrasive properties of the mineral fillers and fibers, and also to the low abrasion resistance of otherwise desirable resins. In apparatus having moving parts, high abrasion resistance would greatly increase the usefulness and life of such moldings. Abrasive surface wear causes dimensional changes and produces a fine dust. The dust not only causes mechanical problems such as binding of close-fitting moving parts, but in electrical equipment can also cause malfunction by settling between electrical contacts and preventing them from closing the electrical circuits. The problem is accentuated by the increased life now required in electrical apparatus. Where previous moldings performed for thousands of cycles, equipment is now designed to operate for millions of cycles, so that previously acceptable abrasion resistance has now become marginal or unsatisfactory.

Low abrasion resistance is also damaging in other circumstances. In some applications, movement caused by vibration will cause mounting surfaces to wear into each other and loosen the mounting or cause fasteners to wear through the molding, with resultant malfunction and failure of the apparatus.

Many attempts have been made to improve the wear resistance of mineral filled thermosetting plastic moldings. Increasing the amount of organic binder helps some and the additions of small amounts of wax or metallic soaps with high melting points have some beneficial effects. Improvements made by these additions, however, are obtained at the sacrifice of other properties, and before the abrasion resistance becomes of a magnitude that is satisfactory, other physical properties, such as flexure strength, surface hardness, deflection under load, etc., are reduced to such an extent that the final product is inferior.

The principal object of the present invention is to provide a high degree of abrasion resistance in mineral-filled, thermosetting plastic moldings. A further object of the invention is to improve abrasion resistance without appreciably decreasing the physical and electrical properties of the moldings, and in at least some cases to improve such properties. It is a further object of the invention to decrease the wetting characteristics of the surfaces of moldings, and thereby improve their electrical properties. It is a further object of the invention to obtain these improvements by the addition to the molding composition of components which, in the proportions used, are compatible therewith and stable therein, and which in the preferred compositions appear to interact or cross-link with other components of the composition.

In accordance with the invention, these objects are accomplished by incorporating in the mineral-filled thermosetting molding compound a small proportion of a polyolefin which is solid resin at room temperature. The term "polyolefin" applies to a known group of synthetic resins of which polyethylene and polypropylene are presently the most readily available and preferred polymers. The group comprises various classes or types of solid polyethylenes, including the low-density or branched-chain polymers, the high-density or linear polyethylenes, and the medium-density polyethylenes. As a family, these have many common properties and are in general useful and applicable in accordance with the invention. The group of polyethylenes also includes polyethylene copolymers produced by copolymerizing the polyethylene with a minor proportion of an alpha-olefin such as propylene or butene-1 or an acrylate for the purpose of modifiying certain characteristics of the basic polyethylene, and these may also be used in accordance with the invention.

The molding composition to which the polyolefin is added may be any of various conventional compositions comprising a thermosetting resin and a mineral filler, which preferably includes a reinforcing mineral fiber, together with small proportions of other conventional components such as parting agents, pigments or coloring agents, weathering agents, etc. The character and proportions of these components may be chosen on the usual basis of intercompatability, molding characteristics, intended usage, desired properties, overall economics, etc.

The invention is applicably generally to mineral-filled thermosetting resin compositions, to improve the abrasion resistance of moldings made therefrom. However, the invention is especially applicable to, and in its preferred embodiment is applied to, compositions in which thermosetting resin is a free radical initiated polymer and which contain a free radical catalyst or initiator, since in the presence of such a catalyst the added polyolefin will chemically react and cross link in the composition, to yield finished moldings which, besides improved abrasion resistance, have substantially the same physical properties as without the addition of polyolefin, and in some cases, have better physical properties.

The free radical initiated polymers which may constitute the resins in preferred compositions include conventional polyester-type resins, which generally require and contain free radical initiators. They also include epoxy type resins which are modified to be reactive in the presence of a free radical catalyst. They include, for example, epoxidized polybutadiene resins.

The mineral fillers used may be any of a large number of conventional fillers and mixtures of fillers, and may be selected from the following typical groups: calcium carbonate, clay, silica, talc, alumina, hydrated alumina, calcium sulphate, calcium silicate, antimony trioxide, etc.

The reinforcing fibers used may be any of the conventional mineral fibers, such as fiberglass, asbestos, etc.

A conventional method of manufacturing a mineral-filled, fiberglass-reinforced polyester resin molding compound is as follows: First, the catalyzed resin, pigments, and parting agents are charged into a mixer and mixed together. Second, the mineral fillers are added, and mixed until there is an even dispersion of the fillers in the resin. Third, the glass reinforcements is added and the mixing is continued only long enough to coat or cover the glass fibers. The compound is then ready to mold, using conventional thermosetting molding practices.

The polyolefin is preferably incorporated in the molding-composition in the form of a fine powder, desirably 100-mesh or finer, if optimum properties of surface appearance and uniformity of abrasion resistance are to be obtained. Coarser powders may be used, but surface appearance may suffer. The finer the polyolefin powder used the easier it will be to obtain a uniform blending and dispersion in the mix, which is desirable both for purposes of abrasion resistance and to minimize surface blemishing. When the polyolefin is added as a fine powder, I prefer to thoroughly admix it with the resin before adding the mineral filler. The polyolefin may also be added with the mineral fibers, for ease of handling. If desired, or if the polyolefin used is a coarse material, the polyolefin may be prepared by first dissolving it in a volatile solvent, such as carbon tetrachloride, with heat as needed, and mixing the solution with a quantity of mineral filler, and subsequently removing the solvent and grinding the solid mixture to a fine condition. The exact method or time of adding the polyolefin to the molding composition is not as important as complete dispersion of the polyolefin throughout the compound. A uniform blend of resin, filler, and polyolefin powder is desirably obtained before adding the glass or other mineral fiber reinforcing material, in order to minimize the amount of mixing to which the fiber is subjected.

The amount of polyolefin added will, of course, depend on the desired degree of improvement in abrasion resistance, on the character and proportions of other components present, on the physical properties required, etc. Effective amounts of polyolefin range from about one-half (½) percent or less up to about 10% by weight of the total composition. In general, small additions of polyolefin produce proportionately greater improvement in abrasion resistance per increment of polyolefin added than do additional incremental of added polyolefin, and an optimal percentage will be reached at which further additions produce little further improvement in abrasion resistance. In the preferred compositions containing free radical initiated polymers and free radical catalysts, the first increments of added polyolefin may improve physical properties, although in at least some cases further additions have an adverse effect on such properties.

Tests for abrasion resistance of moldings in accordance with the invention have been conducted on various types of equipment, designed to simulate various abrasion conditions encountered in electrical or mechanical devices. Three types of test equipment which I have found appropriate are illustrated in the accompanying drawing.

Figure 2:
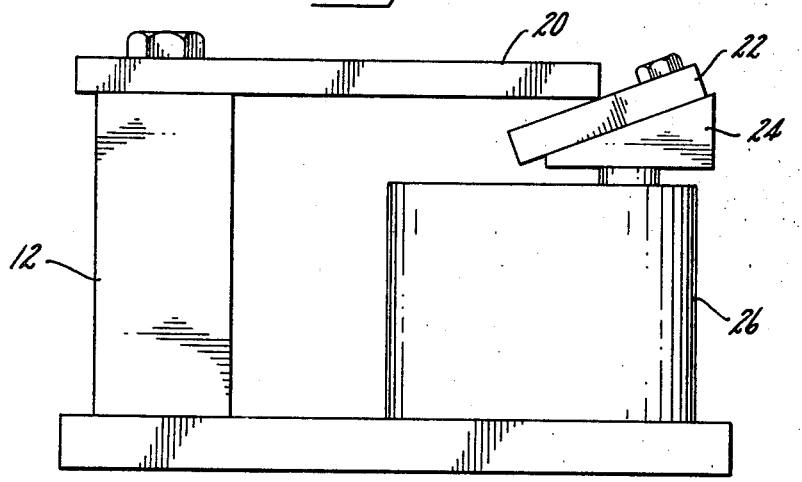
Figure 3:
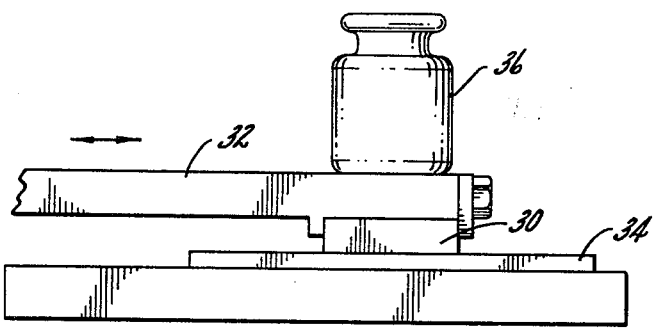

In such drawing:

FIG. 1 is a diagrammatic side elevation of a test device in which abrasion resistance is indicated by the depth to which a vibrating metal ball penetrates into a test sample in a predetermined time;

FIG. 2 is a diagrammatic side elevation of a test device in which abrasion resistance is indicated by the depth of penetration of the corner of one test sample into the face of another test sample vibrated against the first; and FIG. 3 is a diagrammatic side elevation of a test device in which abrasion resistance is indicated by the number of rubbing cycles required to produce a given weight loss in a test sample when reciprocated under load against a stainless steel surface.

In the test apparatus of FIG. 1, a test sample 10 is fixed on a support 12 and a steel ball 14 is vibrated in contact with the sample, under a predetermined load, by a vibrator 16. Depth of ball penetration in a given time indicates the abrasion resistance of the sample.

In the test apparatus of FIG. 2, one test sample 20 is fixed on a support 12, and a second sample 22 is mounted on an angle block 24 in contact with the corner of the first sample 20, under a predetermined pressure. The angle block 24 and second sample 22 are vibrated by a vibrator 26 for a specified length of time, and the depth of penetration into the surface of the test sample 22 is taken as the indication of abrasion resistance.

In the test apparatus of FIG. 3, a test sample 30 is reciprocated by a bar 32 against the surface of a stainless steel wear plate 34, under a load 36 which applies a predetermined weight per square inch of rubbing surface of the sample. The weight loss in a given number of cycles required indicates the abrasion resistance of the sample.

The invention is illustrated by the following examples, which are given as typical and representative and not as limiting.

In such examples, the proportions given are by weight. In each test, a group of five test samples were tested under standardized test conditions and the abrasive penetration results given represent the results on all five samples. The numerical values given for abrasive penetration represent depth of penetration measured on a standardized scale.

Example I

Moldings were made from a molding compound containing 19% catalyzed polyester resin, 5% glass fiber, and 76% mineral filler, with and without the addition of 3% polyethylene. Groups of test samples of such moldings were tested on the apparatus of FIGS. 1 and 2, and the following abrasion resistance results were obtained.

| Test Method | Abrasive Penetration | |
|---|---|---|
| | No Polyethylene | 3% Polyethylene |
| Fig. 1 | 36 | 6 |
| Fig. 2 | 15 | 3 |

Example II

Moldings were made from a molding compound containing 25% catalyzed polyester resin, 15% glass fiber, and 60% mineral filler, with and without the addition of 3% polyethylene. Test samples of such moldings gave the following abrasion resistance results:

| Test Method | Abrasive Penetration | |
|---|---|---|
| | No Polyethylene | 3% Polyethylene |
| Fig. 1 | 17 | 6 |
| Fig. 2 | 15 | 3 |
| Fig. 3 (20x10³ cycles) | ¹ 0.6 | ¹ 0.1 |

¹ Gm. loss.

Example III

Moldings were made from a molding compound containing 30% catalyzed polyester resin, 30% glass fiber, and 40% mineral filler, with and without the addition of 3% polyethylene. Test samples of such moldings gave the following abrasion resistance results:

| Test Method | Abrasive Penetration | |
|---|---|---|
| | No Polyethylene | 3% Polyethylene |
| Fig. 1 | 19 | 7 |
| Fig. 2 | 17 | 10 |

Example IV

Moldings were made from molding compounds containing 30% modified epoxy resin, 15% glass fiber, and 55% mineral filler, with and without the addition of 3% polyethylene. The modified epoxy resin used was that sold as "Oxiron" PC-1 the manufacturer of which identifies it as a stable premix material such as is described in U.S. Patent No. 2,829,135, with an oxirane content of about 9%, and containing fumaric acid in sufficient amount to react with the oxirane oxygen on heating. Test samples of such moldings were tested on the apparatus of FIGS. 1 and 2, and the following abrasion resistance results were obtained:

| Test Method | Abrasive Penetration | |
|---|---|---|
| | No Polyethylene | 3% Polyethylene |
| Fig. 1 | 8 | 4½ |
| Fig. 2 | 17½ | 3½ |

As noted above, the amount of polyolefin to be used in any particular molding composition will vary with the character and proportions of resin, filler and fiber in the composition and with the degree of abrasion resistance and other properties desired. The optimum will vary with the properties required. The amount used may range from an effective small amount sufficient to produce effective improvement in abrasion resistance, up to an optimal percentage at which abrasion resistance is substantially maximum and beyond which additional polyolefin produces little or no improvement in abrasion resistance and may adversely effect other properties, as indicated by the following examples.

Example V

Moldings were made from a molding composition containing 30% catalyzed polyester resin, 30% glass fiber, and 40% mineral filler, by weight, with varying percentages of polyethylene, ranging from none to 10%. Test samples of these moldings were tested on the apparatus of FIG. 2 and the results obtained are tabulated below. In addition, test samples of the same compositions were tested for flexural strength by a standard method. The results of these flexure tests are also tabulated below.

| Percent Polyethylene | Abrasive Penetration | Flexure Strength, Lbs./sq. in. |
|---|---|---|
| 0 | 25 | 32,453 |
| 2½ | 13 | 33,542 |
| 5 | 11 | 25,013 |
| 7½ | 7 | 21,467 |
| 10 | 6 | 20,594 |

For this composition and by this abrasion test, the gain in abrasion resistance for each added percentage of polyethylene decreased as the amount added increased. Small additions were proportionately more effective than large additions and a maximum result was reached at about 10% of added polyethylene.

While such 10% of added polyethylene produced a significant reduction in flexural strength, a 2½% addition of polyethylene reduced the abrasive penetration to half what it was with no added polyethylene, and at the same time, significantly increased the flexural strength.

Example VI

Moldings were made of compositions containing 24% catalyzed polyester resin, 15% fiberglass, and 61% mineral filler, by weight, with varying percentages of polyethylene. Tests of the moldings on the apparatus of FIG. 1, gave the following results:

| Percent polyethylene: | Abrasive penetration |
|---|---|
| 0 | 17 |
| 1 | 10¾ |
| 1½ | 9 |
| 2 | 6¾ |
| 2½ | 6¼ |
| 3 | 6 |

Again, the gain for each increment of polyethylene added decreased as the amount added increased, and a maximum result was reached at about 3% addition.

Example VII

Moldings were prepared from a composition containing 25% catalyzed polyester resin, 15% fiberglass, and 60% mineral filler, with varying amounts of added polyethylene, as in Example II. Test samples were subjected to flexure until failure occurred, and the results obtained were as follows:

| Percent polyethylene: | Flexure strength, Lbs./sq. in. |
|---|---|
| 0 | 23,000 |
| 1 | 23,700 |
| 1½ | 24,200 |
| 2 | 21,000 |
| 3 | 21,300 |

Again, as in Example V, it was found that flexure strength was increased by small additions of polyolefin, while larger additions reduced the flexure strength.

Example VIII

Moldings were made from the molding compositions of Example 2, except that 3% polypropylene was used instead of polyethylene. Samples were tested for abrasion resistance with the following results.

| Test Method | No Polyolefin | 3% Polypropylene |
|---|---|---|
| Fig. 1 | 17 | 10 |
| Fig. 2 | 15 | 8 |

Numerous other compositions may be made in which up to 10% of polyolefin is added to other thermosetting resin compositions containing varying proportions of components in accordance with canventional practices in the art. In the interests of abrasion resistance, the proportion of resin present is preferably at least about 15% and may range up to 60% or more of the basic compositions. The top limit on resin is usually a matter of economics. The mineral filler may comprise from 40% to 85% of the total basic composition, and such filler may be partially or wholly composed of fibrous reinforcing material in amounts of from 5% to 50% of the basic composition.

The addition of polyolefin in accordance with the invention is especially advantageous in compositions containing free radical initiated resins, such as polyester resins and modified epoxy resins. The polyester resin molding compounds have a very high tolerance for polyolefins compared to that for materials such as wax and metallic soaps previously used in attempts to reduce the abrasion resistance of mineral-filled molding compositions. There appears to be a chemical reaction of the polyolefins in the compositions containing free radical initiated resins. Moldings of the material containing added polyolefin have different surface characteristics from moldings of the base composition, and do not wet as easily as moldings without the added polyolefin. This is highly advantageous in electrical moldings, for if the moisture will condense on electrical insulators in droplets rather than a film, the surface leakage will be lower. We believe the reduction of strength which occurs with increasing additions of polyethylene, as in the flexure tests of Examples V and VII, may be due to the fact that the polyolefin-containing material does not bond to the reinforcing fibers and the particles of filler material as strongly as does the polyester resin alone.

The improved abrasion resistance of moldings made in accordance with this invention greatly increases the usefulness of the moldings. The designer is no longer required to minimize or avoid rubbing contact at the surfaces of the moldings, and bearing surfaces can often be formed as part of a molding and special bearing elements can be eliminated.

I claim:

1. A molding composition adapted to undergo thermosetting reaction under molding conditions to produce a thermoset molding having improved abrasion-resistance, comprising a basic composition of from 15 percent to 60 percent of a thermosetting resin consisting of a free radical initiated polymer and a free-radical initiator therefor, and from 40 percent to 85 percent of mineral filler, and a component to improve the abrasion resistance of the basic composition, said component consisting of a polyolefin resin which is solid at normal temperature, in a proportion of from about one-half of one percent up to about 10 percent of the total basic composition.

2. A molding composition as defined in claim 1 in which the abrasion-resistance component is a polyethylene resin.

3. A molding composition as defined in claim 1 in which the abrasion-resistance component is a polypropylene resin.

4. A molding composition as defined in claim 1 in which the abrasion-resistance component is a polyethylene copolymer resin.

5. A molding composition as defined in claim 1 in which the filler contains mineral fiber reinforcement in an amount up to 50% of the basic composition.

6. A molding composition as defined in claim 1 in which the basic composition resin is a polyester resin.

7. A molding composition as defined in claim 1 in which the basic composition resin is an epoxypolybutadiene resin.

8. A molding composition as defined in claim 1 in which the basic composition resin is selected from the group consisting of polyester and epoxy-polybutadiene resins.

9. A curved thermostat molding composed of a cured basic composition of from 15 percent to 60 percent of a thermosetting resin consisting of a free radical initiated polymer and a free radical initiator therefor, and from 40 percent to 85 percent of mineral filler, and from about one-half of one percent up to about 10 percent of a component interspersed in the basic composition to improve the abrasion resistance thereof, consisting of a polyolefin resin which is solid at normal temperature.

10. A molding as defined in claim 9 in which the basic composition resin is a polyester resin.

11. A molding as defined in claim 9 in which the basic composition resin is a polyester resin and the polyolefin resin is a polyethylene resin.

12. A molding as defined in claim 9 in which the polyolefin is at least partially cross linked with the free radical initiated polymer resin.

References Cited
UNITED STATES PATENTS

| | | | |
|---|---|---|---|
| 2,518,462 | 8/1950 | Gowing et al. | 260—873 |
| 3,328,339 | 6/1967 | Tierney | 260—37 |
| 3,256,362 | 6/1966 | Craubner et al. | 260—862 |
| 3,291,857 | 12/1966 | Howertoh | 260—837 |

OTHER REFERENCES

Bjorksten et al.: "Polyesters and Their Applications," 1956, page 73.

Skeist: "Epoxy Resins," Plastics Application Series, Reinhold Publishing Co., 1958, pages 77 and 78.

ALLAN LIEBERMAN, *Primary Examiner.*

UNITED STATES PATENT OFFICE
CERTIFICATE OF CORRECTION

Patent No. 3,397,169                                                August 13, 1968

Robert E. Wilkinson

It is certified that error appears in the above identified patent and that said Letters Patent are hereby corrected as shown below:

Column 3, line 46, "incremental" should read -- increments --. Column 6, line 33, "canventional" should read -- conventiona --. Column 7, line 31, "curved thermostat" should read -- cured thermoset --.

Signed and sealed this 27th day of January 1970.

(SEAL)
Attest:

Edward M. Fletcher, Jr.                            WILLIAM E. SCHUYLER, JR.
Attesting Officer                                               Commissioner of Patents